US008656476B2

(12) United States Patent
Dawson et al.

(10) Patent No.: US 8,656,476 B2
(45) Date of Patent: Feb. 18, 2014

(54) PROVIDING NOTIFICATION OF SPAM AVATARS

(75) Inventors: Christopher J. Dawson, Bethesda, MD (US); Rick A. Hamilton, II, Richmond, VA (US); Brian M. O'Connell, Research Triangle Park, NC (US); Clifford A. Pickover, Yorktown Heights, NY (US); Keith R. Walker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 615 days.

(21) Appl. No.: 12/473,817

(22) Filed: May 28, 2009

(65) Prior Publication Data
US 2010/0306853 A1    Dec. 2, 2010

(51) Int. Cl.
*G06F 21/00* (2013.01)
(52) U.S. Cl.
USPC .............................. 726/11; 726/13
(58) Field of Classification Search
None
See application file for complete search history.

(56) References Cited

U.S. PATENT DOCUMENTS

| | | | |
|---|---|---|---|
| 5,852,672 | A | 12/1998 | Lu |
| 6,907,571 | B2 | 6/2005 | Slotznick |
| 6,909,429 | B2 | 6/2005 | Gottesman et al. |
| 7,110,950 | B2 | 9/2006 | Basso et al. |
| 7,366,670 | B1 | 4/2008 | Basso et al. |
| 2005/0097179 | A1 | 5/2005 | Orme |
| 2006/0036695 | A1* | 2/2006 | Rolnik ........................ 709/206 |
| 2007/0032221 | A1 | 2/2007 | Badt |
| 2007/0079379 | A1 | 4/2007 | Sprosts et al. |
| 2007/0083929 | A1 | 4/2007 | Sprosts et al. |
| 2007/0190990 | A1* | 8/2007 | Yin ............................ 455/414.3 |
| 2007/0220607 | A1 | 9/2007 | Sprosts et al. |
| 2008/0120558 | A1* | 5/2008 | Nathan et al. ................ 715/764 |
| 2008/0195713 | A1* | 8/2008 | Benschop et al. ........... 709/206 |
| 2009/0055484 | A1* | 2/2009 | Vuong et al. ................ 709/206 |
| 2009/0210505 | A1* | 8/2009 | Thomas et al. .............. 709/206 |
| 2011/0041181 | A1* | 2/2011 | Niccolini et al. .............. 726/23 |

OTHER PUBLICATIONS

Final Office Action dated Dec. 30, 2010 for U.S. Appl. No. 12/115,706, filed May 6, 2008.
Final Office Action dated Apr. 5, 2011 for U.S. Appl. No. 12/115,706, filed May 6, 2008.

\* cited by examiner

*Primary Examiner* — Michael S McNally
*Assistant Examiner* — Carlton Johnson
(74) *Attorney, Agent, or Firm* — William E. Schiesser; Keohane & D'Alessandro, PLLC

(57) ABSTRACT

The system monitors activities, movements, and other behavior patterns necessary to determine whether an avatar is a spam advertisement. A storing mechanism stores a "black list" and a black list score consisting of a list of spam avatar identifications (UUIDs) matching avatars that have been flagged as confirmed or suspected spam advertisers. Another mechanism allows the owner to redraw or otherwise re-render a distinguishing mark or other audible signature when an avatar has been detected as being a spam advertiser. Yet another mechanism signals to the owner an offending avatar that they have been added to the black list or had a report filed against them, and a reason as to why (the methods used to identify them). Another mechanism allows for a black listed avatar to be removed from the black list, and scores to be decreased and for the virtual universe and users to utilize the black list and score.

20 Claims, 7 Drawing Sheets

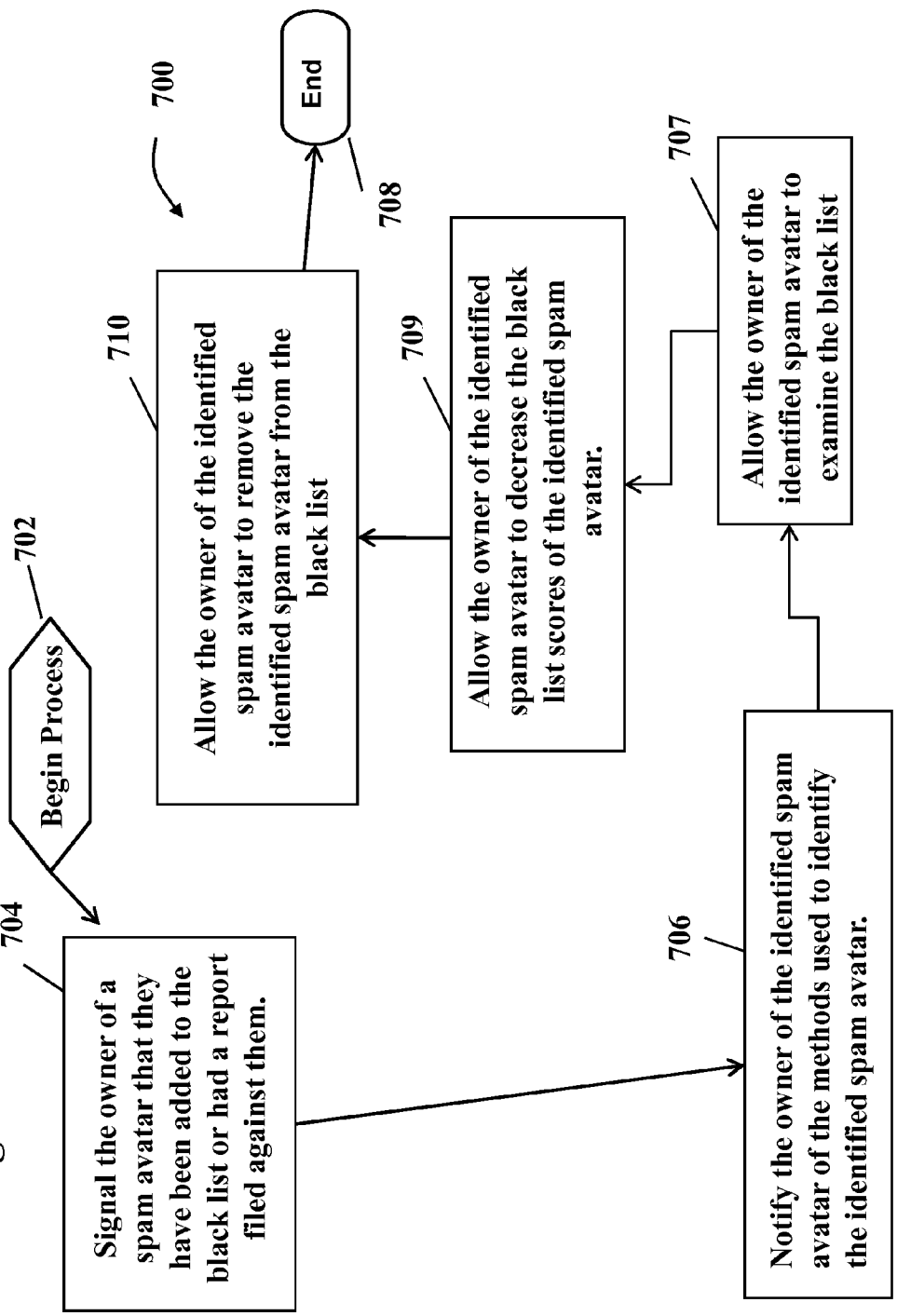

PROVIDING NOTIFICATION OF SPAM AVATARS

CROSS-REFERENCE TO RELATED APPLICATIONS

This patent application is related to co-pending patent application entitled "IDENTIFYING SPATIAL LOCATIONS OF EVENTS WITHIN VIDEO IMAGE DATA", filed Mar. 19, 2009, having Ser. No. 12/407,499, co-pending patent application entitled "CODING SCHEME FOR IDENTIFYING SPATIAL LOCATIONS", FILED Mar. 19, 2009, having Ser. No. 12/407,520, co-pending patent application entitled "SYSTEM AND METHOD IN A VIRTUAL UNIVERSE FOR IDENTIFYING SPAM AVATAR BASED UPON AVATAR MULTIMEDIA", filed Dec. 23, 2008, having Ser. No. 12/342,943, and co-pending patent application entitled "IDENTIFYING SPAM AVATARS IN A VIRTUAL UNIVERSE BASED UPON USING TURING", filed Dec. 23, 2008, having Ser. No. 12/343,125.

BACKGROUND OF THE INVENTION

As the population of virtual universes (VUs) increases, and as the density and intensity of personal activities and commercial transactions increase, greater emphasis will be placed on advertising. Just as in the real world, innovative and intrusive advertising activities will be launched and widely distributed. Unlike the real world, advertising in VUs is much less constrained by the limiting laws of physics and economics. Surprising new advertising campaigns and mechanisms may be deployed. One advertising mechanism marries unsolicited personal messaging ("spam") with the concept of automated computer controlled advertising avatars that roam around the VU looking to communicate with potential human avatars.

In some systems, advertisement avatars are automated. However, automated avatars can create problems within a VU if abused, much the same as spam email can cause problems in an email communication system, a.k.a., "avatar-based VU spam".

Avatar-based VU spam has the potential to literally impede or block a user's motion in a VU. Avatar-based VU spam has the potential to impede lifelike transactions (e.g., business, romance). Avatar-based VU spam has the potential to devalue a user's virtual property. Avatar-based VU spam has the potential to make the VU run so slowly as to make it unusable (due to the CPU's need to run the spam avatars). Avatar-based VU spam has the potential to block the avatar's line of sight.

It could be, however, that the spam avatar has been misidentified and that the owner of the avatar may not even know that its avatar has been so identified. There may be a need to notify the owner that the avatar has been identified as a spam avatar, maybe based on a distinguishing mark on the avatar, and allow the avatar owner to make changes to the avatar so that the avatar is no longer identified as a spam avatar.

Therefore, there exists a need for a solution that solves at least one of the deficiencies of the related art.

SUMMARY OF THE INVENTION

In general, aspects of the present invention provide systems and methods for identifying spam avatars used for spam unsolicited advertising purposes. A storing mechanism may store a "black list" and a black list score consisting of a list of spam avatar identifications (UUIDs) matching avatars that have been flagged as confirmed or suspected spam advertisers. Another mechanism allows the owner to redraw or otherwise re-render a distinguishing mark or other audible signature when an avatar has been detected as being a spam advertiser. Yet another mechanism signals to the owner an offending avatar that they have been added to the black list or had a report filed against them, and a reason as to why (the methods used to identify them). Another mechanism allows for a black listed avatar to be removed from the black list, and scores to be decreased and for the virtual universe and users to utilize the black list and score.

In one embodiment, the present invention comprises a method in a virtual universe system having avatars and spam avatars, the avatars and spam avatars having owners and identifications, the method comprising identifying a spam avatar having a distinguishable mark identifying the avatar as a spam avatar, storing the identification of the spam avatar, notifying the owner of the spam avatar that the spam avatar has been identified, and allowing the owner to re-render the distinguishable mark.

In yet another embodiment, the present invention comprises a computer program product embodied in a computer readable medium for operating in a system comprising a network I/O, a CPU, and one or more databases, for implementing a method for identifying spam avatars, notifying owners of spam avatars that their avatars have been identified as spam avatars, and allowing the owners of the identified spam avatars to re-render the identified spam avatars, the method comprising identifying a spam avatar having a distinguishable mark identifying the avatar as a spam avatar, and the spam avatar further having an owner and an identification, storing the identification of the identified spam avatar, notifying the owner that the identified spam avatar has been identified, and allowing the owner to re-render the distinguishable mark.

In yet another embodiment, the present invention comprises a system in a virtual universe system having avatars and spam avatars, the avatars and spam avatars having owners and identifications, the system comprising a spam avatar identifier, wherein the spam avatar has a distinguishable mark identifying the avatar as a spam avatar, an identification storage component to store the identification of the spam avatar, a notification component for notifying the owner of the spam avatar that the spam avatar has been identified, and a modification component for allowing the owner to re-render the distinguishable mark.

In another embodiment, the present invention comprises a method for deploying a system for automatically creating a virtual rendition of at least one physical resource to replicate a real-life environment, the system in a virtual universe system having avatars and spam avatars, the avatars and spam avatars having owners and identifications, the system comprising a spam avatar identifier, wherein the spam avatar has a distinguishable mark identifying the avatar as a spam avatar, an identification storage component to store the identification of the spam avatar, a notification component for notifying the owner of the spam avatar that the spam avatar has been identified, and a modification component for allowing the owner to re-render the distinguishable mark.

Embodiments of the present invention also provide related systems, methods and/or program products.

BRIEF DESCRIPTION OF THE DRAWINGS

These and other features of this invention will be more readily understood from the following detailed description of the various aspects of the invention taken in conjunction with the accompanying drawings in which:

FIG. 7 illustrates another method of the present invention

The drawings are not necessarily to scale. The drawings are merely schematic representations, not intended to portray specific parameters of the invention. The drawings are intended to depict only typical embodiments of the invention, and therefore should not be considered as limiting the scope of the invention.

DETAILED DESCRIPTION OF THE DRAWINGS

Aspects of the present invention provide a solution for identifying spam avatars used for spam unsolicited advertising purposes by distinguishable marks, for notifying owners of such identified spam avatars, and for allowing the owners to modify the distinguishable marks of the identified spam avatars.

A computer avatar is a personalized graphic file or rendering that represents a computer user. There are basically two types of avatars: those used at websites, such as on Web exchange boards, and those used in gaming and virtual worlds. While Web users have static graphics files as avatars, in virtual worlds, the avatar is a fully rendered interactive character. A virtual world is an animated three-dimensional world created with computer graphics imagining (CGI) and other rendering software. One of the hallmarks of a virtual world is that a user can interact within the environment by virtue of an avatar, or a computerized character that represents the user. The avatar manipulates and interacts with objects in the virtual world by mouse movements and keystrokes issued by the user. In simple terms, the avatar is a remote controlled character or proxy. Avatars in a virtual world or virtual universe (VU) have a wide range of business and social experiences, and such experiences are becoming more important as business and social transactions are becoming common in VUs such as Second Life®. Second Life is a registered trademark of Linden Labs. In fact, the characteristics of an avatar play important social, business, and other related roles in VU, such as Second Life. Second Life is a privately owned three-dimensional (3-D) virtual world, made publicly available in 2003 by Linden Lab, and is created entirely by its membership. Members assume an identity and take up residence in Second Life, creating a customized avatar or personage to represent themselves. The avatar moves about in the virtual world using mouse control and intuitive keyboard buttons. The Second Life client program provides users (referred to as residents) with tools to view, navigate, and modify the virtual world and participate in its virtual economy. Social and business interactions are important in Second Life, and these interactions include resident interactions in both personal and business meetings.

Figure 1:
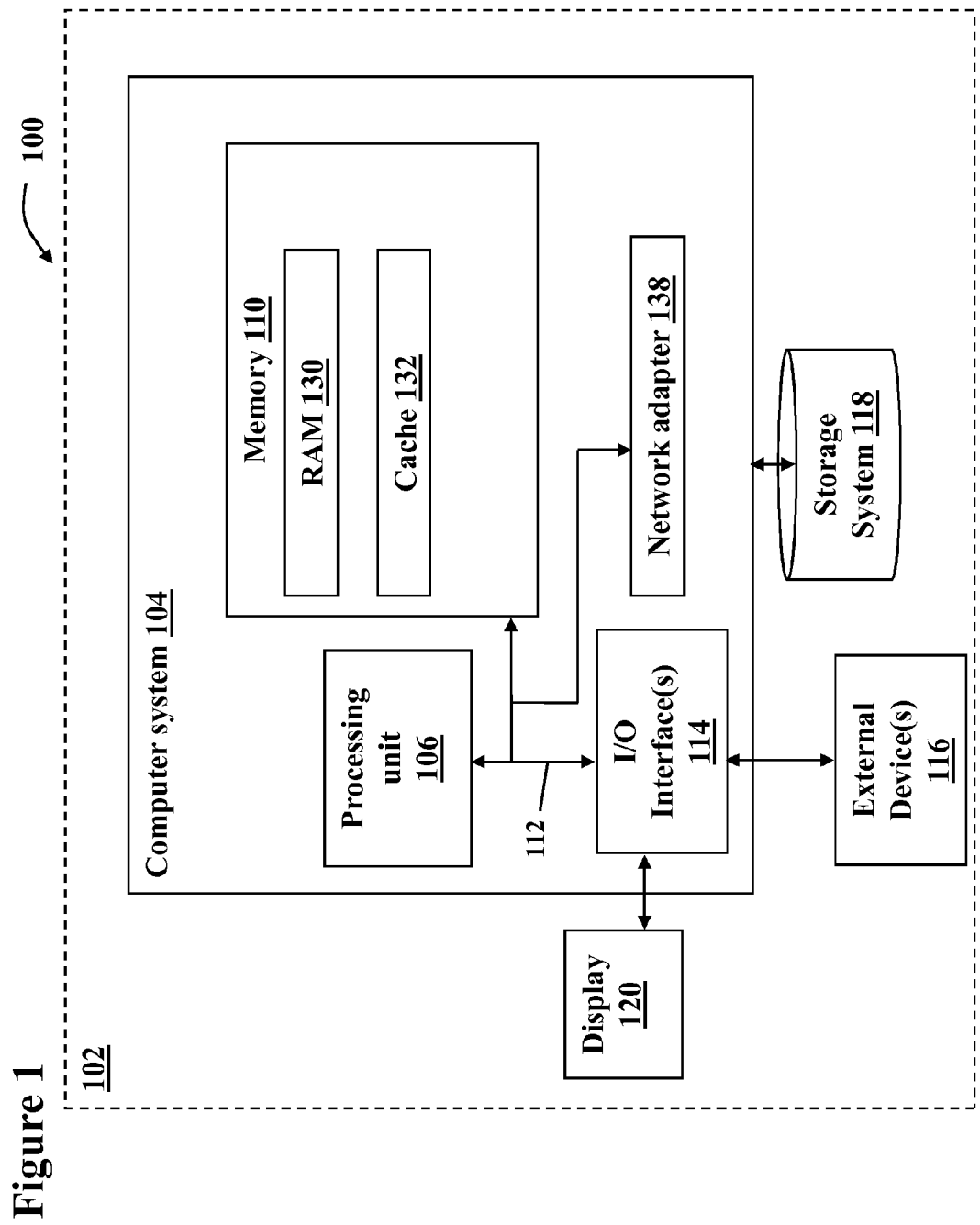
FIG. 1 shows a data processing system suitable for implementing an embodiment of the present invention.

A data processing system 100, such as system 102 shown in FIG. 1, suitable for storing and/or executing program code of the present invention will include a computer system 104 having at least one processor (processing unit 106) coupled directly or indirectly to memory elements through a system bus 112. The memory elements can include local memory (RAM 130) employed during actual execution of the program code, bulk storage (storage 118), and cache memories (cache 132) which provide temporary storage of at least some program code in order to reduce the number of times code must be retrieved from bulk storage 118 during execution. Input/output or I/O devices (external devices 116) (including but not limited to keyboards, displays (Display 120), pointing devices, etc.) can be coupled to the system either directly or through intervening I/O controllers (I/O Interface(s) 114).

Figure 2:
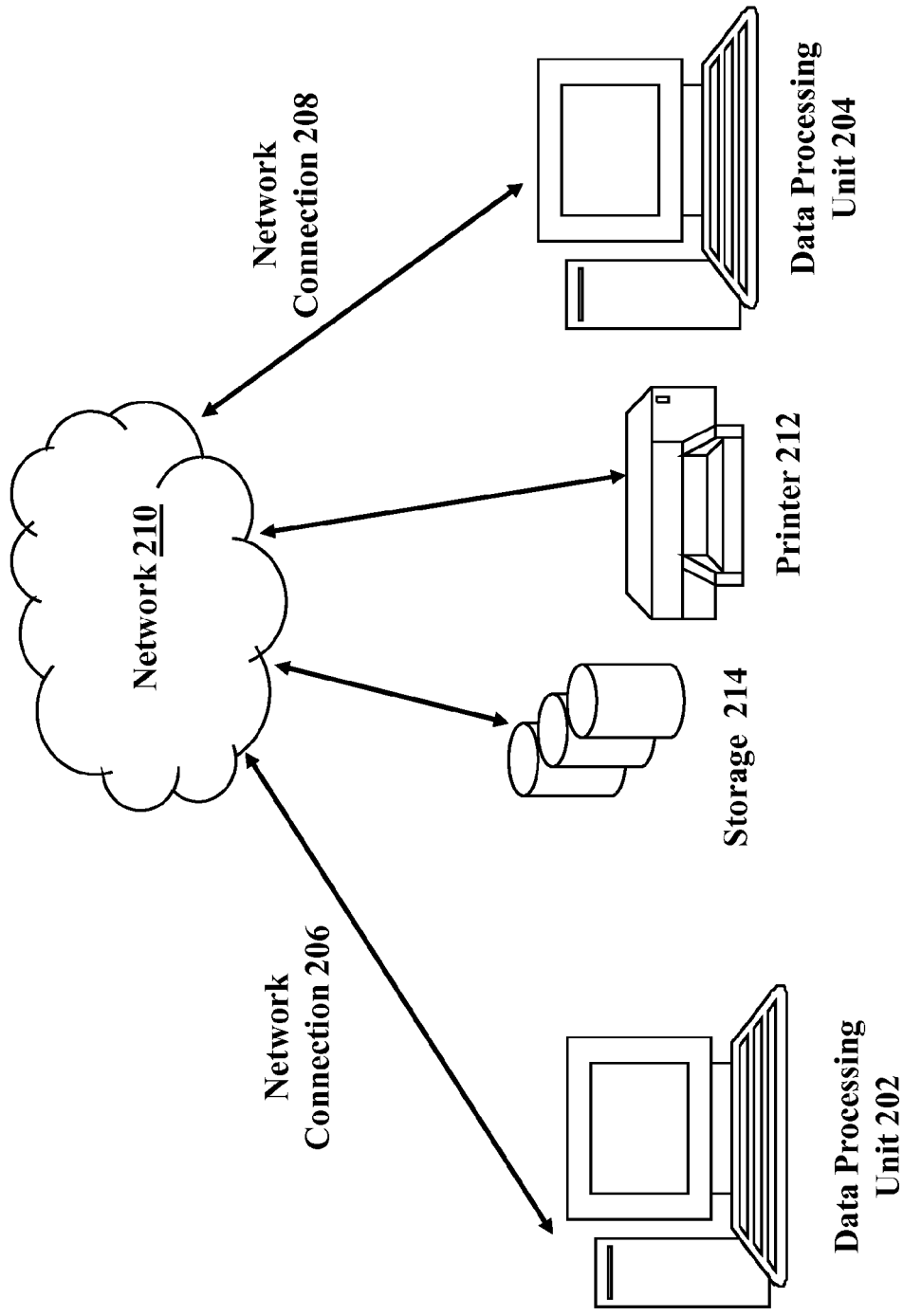
FIG. 2 shows a network which would work with an embodiment of the present invention.

Network adapters (network adapter 138) may also be coupled to the system 200 to enable the data processing system (as shown in FIG. 2, data processing unit 202) to become coupled through network connections (network connection 206, 208) to other data processing systems (data processing unit 202, 204), remote printers (printer 212) and/or storage devices (storage 214) through intervening private and/or public networks (network 210). (A computer network is composed of multiple computers connected together using a telecommunication system for the purpose of sharing data, resources and communication. For more information, see http://historyoftheinternet.org/). Modems, cable modem, and Ethernet cards are just a few of the currently available types of network adapters.

The present invention comprises systems and methods of detecting, analyzing, and managing unsolicited advertisements to VU users through unsolicited communication made by human and computer controlled advertising avatars. Both the residents and owners of VUs would benefit from methods to reduce VU spam such as described herein.

Residents (such as in Second Life) are represented in the environment by an avatar. The basic avatar is humanoid in shape which may be customized in a variety of ways:

A series of GUI controls, modifying every aspect of the basic mesh (body shape, skin, hair style etc.).

Creating clothing or buying clothes made by other Residents.

Attachments—3D objects intended to supplement or replace body structure, clothes or hair.

Animation Overriders (intended to supplement or replace the stock set of animations) using, for instance, a scripting language such as Linden Scripting Language (LSL) to trigger animations stored in an animation file format such as Biovision Hiearchy (BVH).

Sonic Overriders—using a scripting language such as LSL to trigger sounds such as footsteps, or emotive cues such as laughing and crying.

The result can either be faithful to the original humanoid avatar, or can result in a completely non-humanoid representation of the character. These customizations can be packaged up into a single outfit, with common applications of outfits.

As noted above, the VU environment provides an opportunity for commercial vendors to market their wares and conduct other commerce with others who are resident in the VU via avatars. Many times, the commercial vendor will customize its avatar so that the avatar has readily distinguishable visual characteristics, audio characteristics or otherwise distinguishable by other of the avatar's assets. The purpose, of course, is to attract the attention of other avatars (potential customers) or to send unsolicited information about a product or service and so on ("advertisement") so that the commercial vendor's avatar ("spam avatar") may receive business as a result of the advertisement from one or more recipients of the advertisement ("receiving avatars"). Like all other types of unsolicited marketing via any communication means (e.g., telephone, fax, email, text messaging, etc.), all herein referred to as spam, it may be unwanted by one or more of the receiving avatars.

For the purpose of this invention, the term "spam or spam avatar" refers to the avatar advertising a service or product. Furthermore, the term "receiving avatar" refers to the avatar who receives unsolicited information about a product or service.

Figure 3:
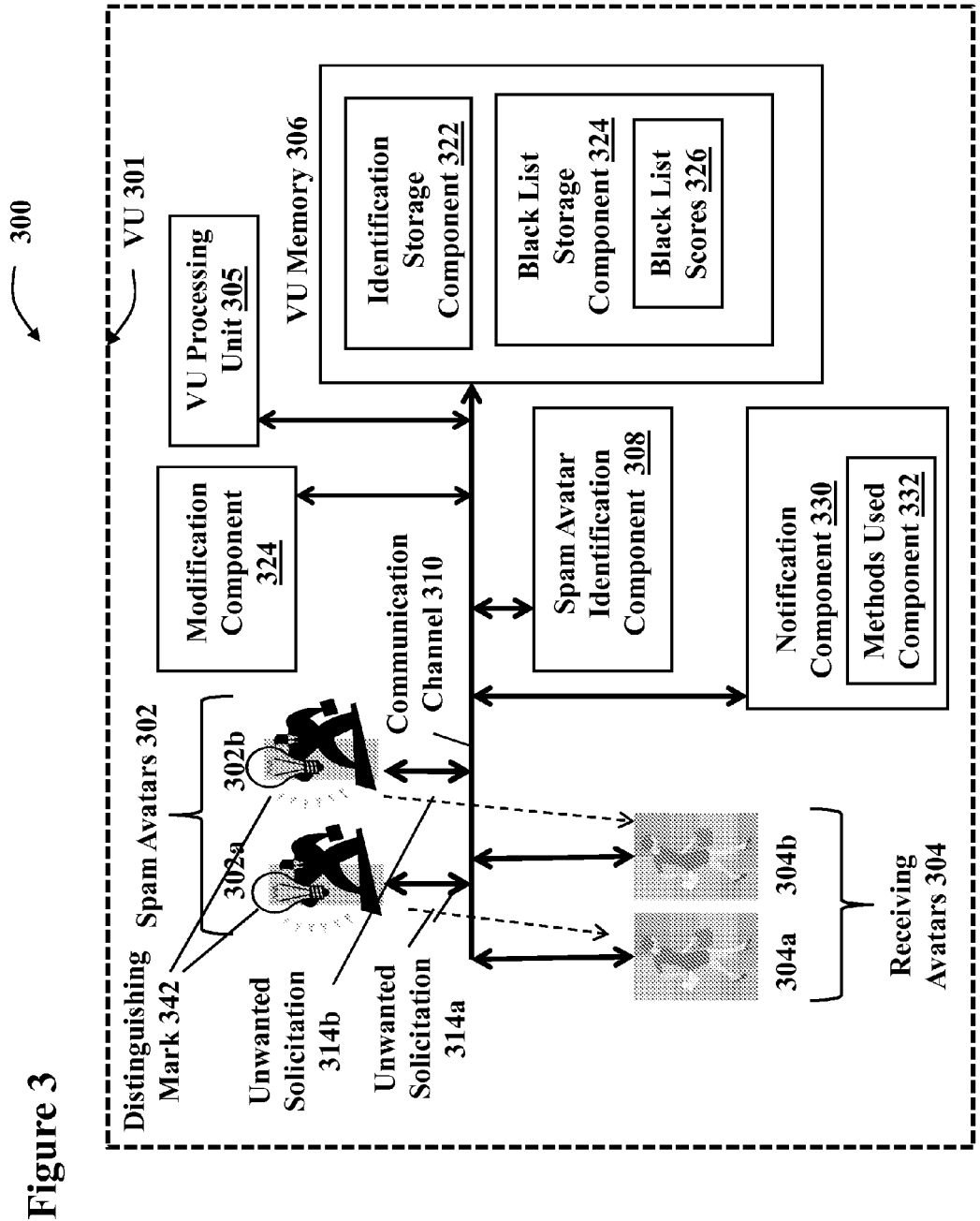
FIG. 3 illustrates a virtual universe showing aspects of the present invention.

A simple avatar system 300 for implementing the present invention is shown in FIG. 3 having a VU 301 having a VU Processing Unit 305, a VU memory 306 for storing information about the VU 301 and activities and avatars within the VU 301, one or more spam avatars 302 (302a, 302b) and one or more receiving avatars 304 (304a, 304b). There can be any number of spam avatars 302 (302a, 302b) and receiving avatars 304 (304a, 304b). The spam avatars 302 and the receiving avatars 304 can communicate with one another via a communication channel 310, amongst themselves and with VU memory 306 or other assets (such as avatar attachments, vehicles, buildings, furniture, sculpture, or other items) in the VU 301 via communications channel 310. Both the spam avatars 302 and the receiving avatars 304 are considered to be VU residents.

As noted above, there is a need for the receiving avatars to have the ability to identify the spam avatars so that the receiving avatars may block the unsolicited communications from the spam avatars should the receiving avatars so desire. There is a further need to notify owners of avatars that their avatars have been black listed as spam avatars and allowing the owners to modify their avatars so that their avatars may be removed from the black list. The present invention provides numerous systems and methods for black listing spam avatars based upon avatar identifiers, notifying the black listed avatars and allowing the owners to modifying the black listed avatars to remove them from the black list.

As shown in FIG. 3, the VU Memory Unit has an Identification Storage Component 322 for storing the identifications or UUIDs of spam avatars or suspected spam avatars and a Black List Storage Component 324 for storing information about spam avatars or suspected avatars. Black List Storage Component 324 further has a Black List Scores Component 326 for storing black list information of spam avatars or suspected spam avatars. Each spam avatar may have a distinguishing mark, such as Distinguishing Marks 342. The Distinguishing Marks 342 may be an audible distinguishing mark, a visual distinguishing mark, a movement distinguishing mark or others. The system further has a Modification Component 324 for allowing an owner of a spam avatar or suspected spam avatar to modify the avatar.

Receiving avatars may choose which solicitations to accept or reject. For instance, a receiving avatar may choose to accept all solicitations from all spam avatars, to accept solicitations from particular spam avatars and to reject all solicitations from all other spam avatars, or to reject all solicitations from all spam avatars.

Figure 4:
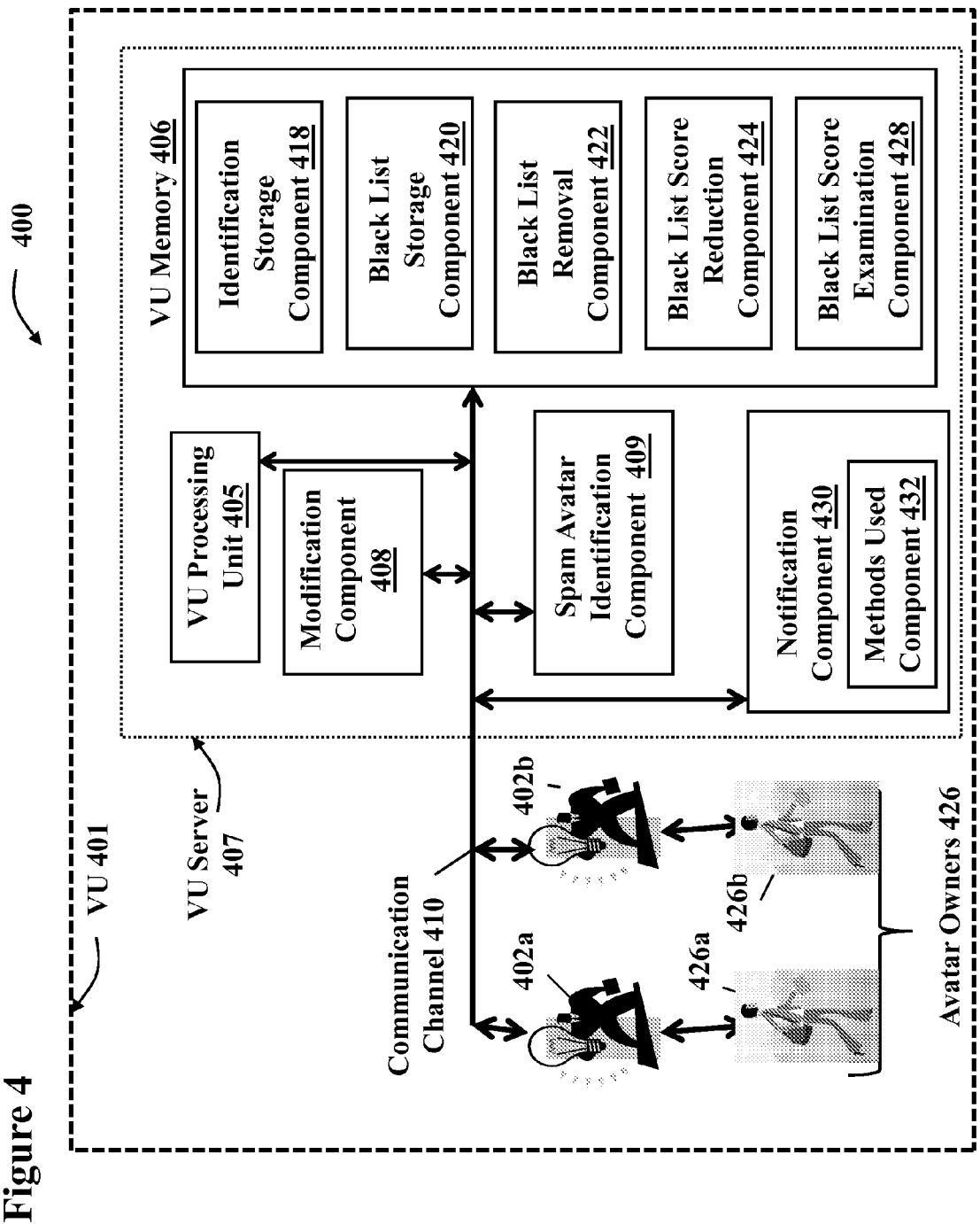
FIG. 4 shows a virtual universe having one embodiment of the system of the present invention.

As shown in FIG. 4, system 400 may have a virtual universe (VU) 401 having a VU server 407. VU 401 may have spam avatars 402a, 402b having spam avatar owners 426a, 426b who can change or control their avatars. The spam avatars 402a, 402b may have distinguishing marks which identify them as spam avatars or potential spam avatars. The distinguishing marks may be audible, visual, or even movement. VU 401 may have a communication channel 410 so that avatars may communicate with VU server 407. VU server 407 may have a VU processing unit 405 and a VU memory unit 406. VU server 407 may have a spam avatar modification component 408 for allowing an avatar owner to modify the owner's avatar. It may further have a spam avatar identification component 409 for identifying spam avatars 402a, 402b. VU server 407 may further have a notification component 430 for notifying owners 426a, 426b that their avatars have been identified as spam avatars or potential spam avatars. Notification component 430 may also have a methods used component 332 which may provide, along with the notification to the owner of the avatar, the methods used to identify the spam avatar.

VU memory 406 may have an identification storage component 418 for storing the identification (UUIDs) of spam or suspected spam avatars. It may further have a black list storage component 420 for storing information about black listed avatars. A black list is a list or register of avatars which, for one reason or another, are being denied a particular privilege, service, mobility, access or recognition. VU memory 406 may further have a black list removal component 422 for allowing owners 426a, 426b to remove the owner's avatar from the black list. VU memory 406 may further have a black list score reduction component 424 for allowing an owner 426a, 426b to reduce the owner's avatar blacklist score. A blacklist score of an avatar indicates the magnitude of the probability that the avatar is a spam avatar. VU memory 406 may further have a black list score examination component 428 for allowing owners of avatars to examine the black list scores of their avatars and have the black list scores reduced by the black list score reduction component 424.

Figure 5:
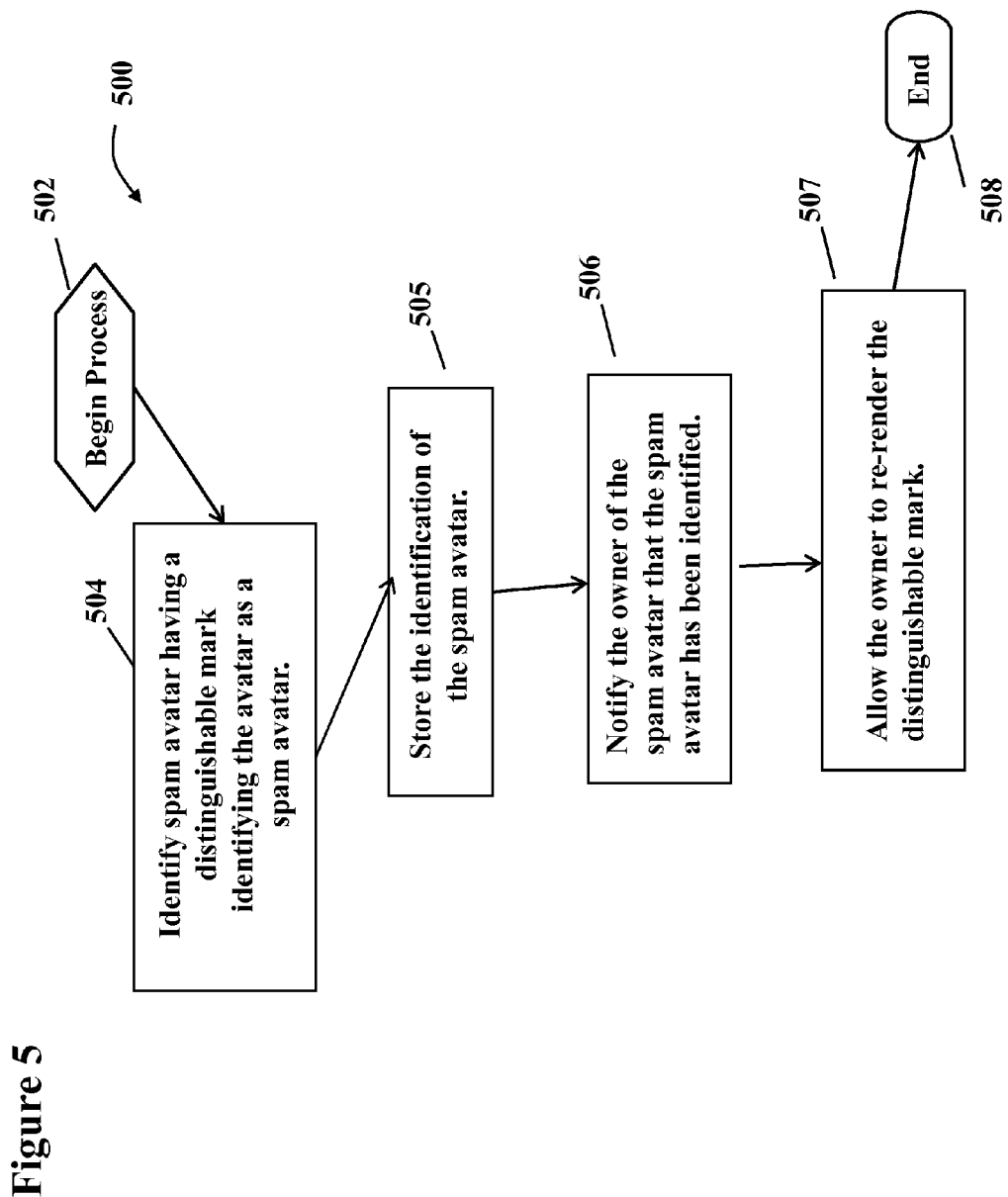
FIG. 5 illustrates one method of the present invention

As shown in FIG. 5, a method 500 of the present invention begins at 502 and continues to 504 where the avatar is identified as a spam avatar by its distinguishable mark—whether it be audible, visual movement or others. At 505, the identification (UUID) of the spam avatar or suspected spam avatar is stored. At 506, the owner of the spam avatar or suspected spam avatar is notified that the spam avatar or suspected spam avatar has been identified by means of a distinguishable mark. At 507, the owner is allowed to change the distinguishable mark and ends at 508.

Figure 6:
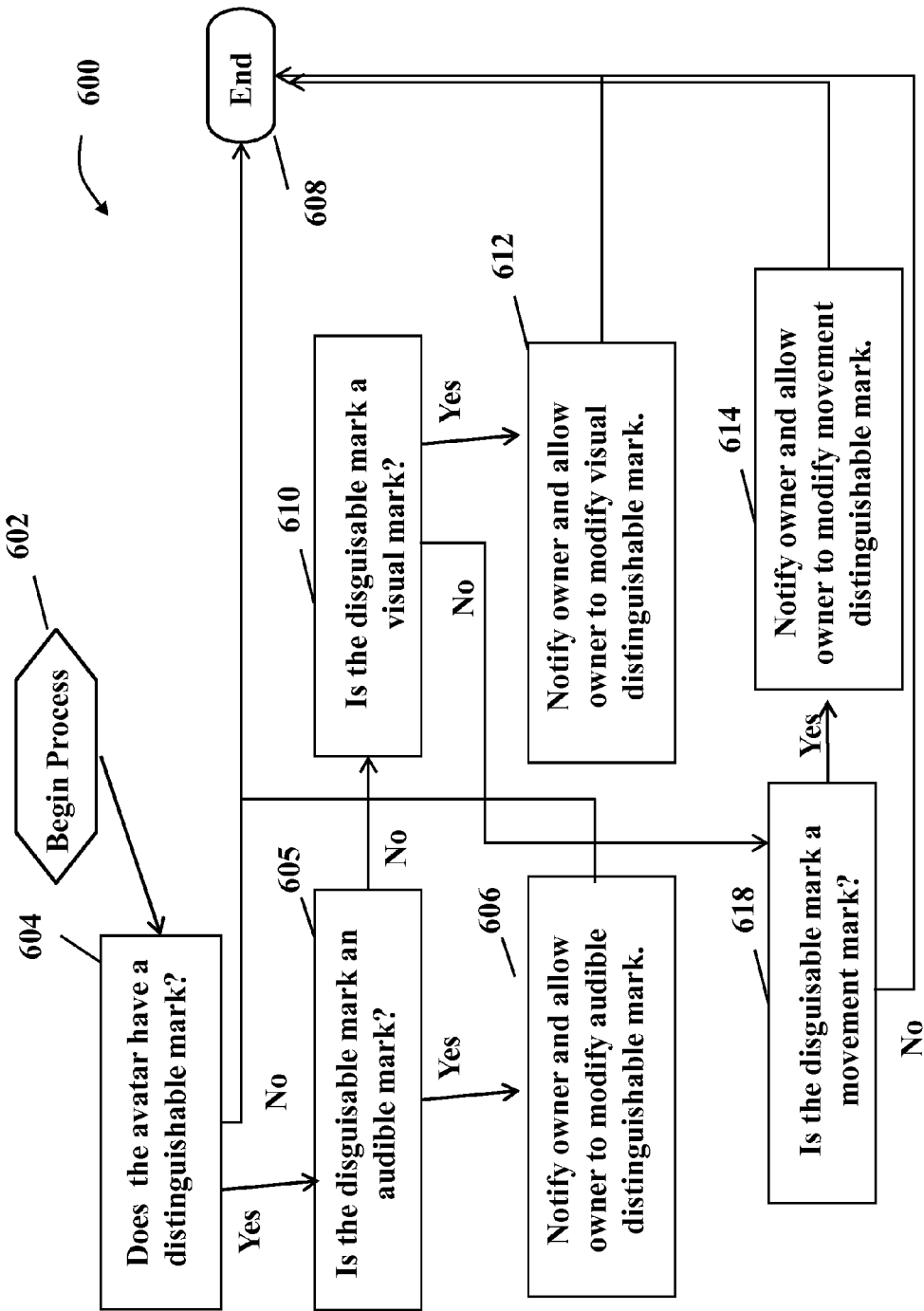
FIG. 6 illustrates another method of the present invention

As shown in FIG. 6, method 600 begins at 602 where it is determined whether an avatar has a distinguishable mark at 604. If not, the method ends at 608. If so, it is determined whether it is an audible mark at 605. If so, the owner is notified and allowed to modify or remove the audible mark at 606. If not, the method ends at 608. If it is not an audible mark, at 610, it determined whether it is a visual distinguishable mark. If so, the owner is notified and allowed to modify or remove the visual mark at 612 and method ends at 608. If not, at 618, it is determined whether the distinguishable mark is a movement mark and, if not, the method ends at 608. If so, the owner of the avatar is notified and is allowed to modify or remove the distinguishable mark.

As shown in FIG. 7, method 700 begins at 702, and at 704 the owner of an avatar is notified or signaled that its avatar has been added to a black list or a report has been filed against it. At 706, the owner of the identified spam avatar is notified of the methods used to identify the spam avatar. At 707, the owner of the identified spam avatar is allowed to examine the black list. At 709, the owner of the identified spam avatar is allowed to decrease the black list score by modifying the distinguishable mark. At 710, the owner of the identified spam avatar is allowed to remove the avatar from the black list by changing the distinguishable mark.

It should be understood that the present invention is typically computer-implemented via hardware and/or software. As such, client systems and/or servers will include computerized components as known in the art. Such components typically include (among others), a processing unit, a memory, a bus, input/output (I/O) interfaces, external devices, etc. It should also be understood that although a specific embodiment involving 2D and 3D virtual renditions of physical resources which are automatically created to replicate real-life environments, such as computer data centers and other trackable assets, has been depicted and described, the present invention could be implemented in conjunction with any type of real-life environments having trackable assets.

While shown and described herein as a system and method for notifying owners of spam identified avatars in a virtual universe and allowing the owners to make modifications, it is understood that the invention further provides various alternative embodiments. The non-transitory computer-readable/useable storage medium includes a program code that implements each of the various process steps of the invention. It is understood that the terms non-transitory computer-readable storage medium or computer useable storage medium comprise one or more of any type of physical embodiment of the program code. In particular, the non-transitory computer-readable/useable storage medium can comprise program code embodied on one or more portable storage articles of manufacture (e.g., a compact disc, a magnetic disk, a tape, etc.), and on one or more data storage portions of a computing device, such as memory and/or storage system (e.g., a fixed disk, a read-only memory, a random access memory, a cache memory, etc.).

In another embodiment, the invention provides a computer-implemented method for notifying owners of spam identified avatars in a virtual universe and allowing the owners to make modifications. In this case, a computerized infrastructure can be provided and one or more systems for performing the process steps of the invention can be obtained (e.g., created, purchased, used, modified, etc.) and deployed to the computerized infrastructure. To this extent, the deployment of a system can comprise one or more of: (1) installing program code on a computing device, such as computer system from a computer-readable medium; (2) adding one or more computing devices to the computer infrastructure; and (3) incorporating and/or modifying one or more existing systems of the computer infrastructure to enable the computerized infrastructure to perform the process steps of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed, and, obviously, many modifications and variations are possible. Such modifications and variations that may be apparent to a person skilled in the art are intended to be included within the scope of the invention as defined by the accompanying claims.

What is claimed is:

1. A method in a virtual universe system having avatars and spam avatars, the avatars and spam avatars having owners and identifications, the method comprising:
    identifying, using at least one computing device, a spam avatar rendered and operating in a region of a virtual universe, the spam avatar rendered with a distinguishable mark that modifies only a portion of the appearance of the spam avatar to differentiate the spam avatar from non-spam avatars;
    storing, using the at least one computing device, the identification of the spam avatar;
    notifying, using the at least one computing device, the owner of the spam avatar that the spam avatar has been identified as a spam avatar based on the distinguishable mark of the avatar rendered and operating within the virtual universe; and
    allowing, using the at least one computing device, the owner to remove the spam avatar from a black list of spam avatars by re-rendering the spam avatar with the distinguishable mark eliminated.

2. The method as defined in claim 1 wherein the distinguishable mark comprises an audible signature.

3. The method as defined in claim 2 wherein the system has a black list storage unit for storing a black list and black list scores, and the identified spam avatar has black list scores associated with the identified spam avatar, the method further comprising storing, using the at least one computing device, the identification of the identified spam avatar on the black list and storing the black list scores associated with the identified spam avatar in the black list storage unit.

4. The method as defined in claim 3 further comprising signaling, using the at least one computing device, to the owner of a spam avatar that they have been added to the black list or had a report filed against them.

5. The method as defined in claim 4 further comprising notifying, using the at least one computing device, the owner of the identified spam avatar of the methods used to identify the identified spam avatar.

6. The method as defined in claim 5 further comprising allowing, using the at least one computing device, the owner of the identified spam avatar to remove the identified spam avatar from the black list and further allowing the owner of the identified spam avatar to decrease the black list scores of the identified spam avatar.

7. The method as defined in claim 6 further comprising allowing, using the at least one computing device, owners of other avatars to examine the black list and score of the identified spam avatar.

8. A non-transitory computer-readable storage medium storing computer instructions, which when executed, enables a computer system for identifying spam avatars, notifying owners of spam avatars that their avatars have been identified as spam avatars, and allowing the owners of the identified spam avatars to re-render the identified spam avatars, the computer instructions comprising:
    identifying a spam avatar rendered and operating in a region of a virtual universe, the spam avatar rendered with a distinguishable mark that modifies only a portion of the appearance of the spam avatar to differentiate the spam avatar from non-spam avatars;
    storing the identification of the spam avatar;
    notifying the owner of the spam avatar that the spam avatar has been identified as a spam avatar based on the distinguishable mark of the avatar rendered and operating within the virtual universe; and
    allowing the owner to remove the spam avatar from a black list of spam avatars by re-rendering the spam avatar with the distinguishable mark eliminated.

9. The non-transitory computer readable storage medium as defined in claim 8 further comprising computer instructions for allowing the owner of the identified spam avatar to modify the distinguishing mark when an avatar has been detected as being a spam advertiser.

10. The non-transitory computer readable storage medium as defined in claim 9 wherein the distinguishable mark comprises an audible signature and wherein the computer instructions further comprise allowing the owner of the identified spam avatar to re-render the audible signature.

11. The non-transitory computer readable storage medium as defined in claim 10, the system having a black list storage component and the identified spam avatar having black list scores, the computer instructions further comprising storing the identification of the identified spam avatar on the black list and storing the identified spam avatar black list scores.

12. A system in a virtual universe environment having avatars and spam avatars, the avatars and spam avatars having owners and identifications, the system comprising:
    a spam avatar identifier for identifying, based on a distinguishable mark, a spam avatar rendered and operating in a region of a virtual universe, the spam avatar rendered with the distinguishable mark that modifies only a portion of the appearance of the spam avatar to differentiate the spam avatar from non-spam avatars;
    an identification storage component to store the identification of the spam avatar;
    a notification component for notifying the owner of the spam avatar that the spam avatar has been identified as a spam avatar based on the distinguishable mark of the avatar rendered and operating within the virtual universe; and
    a modification component for allowing the owner to remove the spam avatar from a black list of spam avatars by re-rendering the spam avatar with the distinguishable mark eliminated.

13. The system as defined in claim 12, wherein the distinguishable mark comprises an audible signature, and wherein the spam avatar identifier identifies by audible signatures.

14. The system as defined in claim 12, the system further comprising:
    a black list storage unit for storing a black list and black list scores, wherein the identified spam avatar has black list scores associated with the identified spam avatar; and
    an identification component for storing the identification of the identified spam avatar on the black list and for storing the black list scores associated with the identified spam avatar in the black list storage unit.

15. The system as defined in claim 14 further comprising a component for: notifying the owner of a spam avatar that the spam avatar has been added to the black list; and
    notifying the owner in the case that the owner has had a report filed against them.

16. The system as defined in claim 15, the component further notifying the owner of the identified spam avatar the methods used to identify the identified spam avatar.

17. The system as defined in claim 16 further comprising a component for:
    allowing the owner of the identified spam avatar to remove the identified spam avatar from the black list; and
    allowing the owner of the identified spam avatar to decrease the black list scores of the identified spam avatar.

18. The system as defined in claim 17 further comprising a component for allowing owners of other avatars to examine the black list and the black list score of the identified spam avatar.

19. A method for deploying a system for automatically creating a virtual rendition of at least one physical resource to replicate a real-life environment, the system in a virtual universe environment having avatars and spam avatars, the avatars and spam avatars having owners and identifications, the system comprising:
    a spam avatar identifier for identifying, based on a distinguishable mark, a spam avatar rendered and operating in a region of a virtual universe, the spam avatar rendered with the distinguishable mark that modifies only a portion of the appearance of the spam avatar to differentiate the spam avatar from non-spam avatars;
    an identification storage component to store the identification of the spam avatar;
    a notification component for notifying the owner of the spam avatar that the spam avatar has been identified as a spam avatar based on the distinguishable mark of the avatar rendered and operating within the virtual universe; and
    a modification component for allowing the owner to remove the spam avatar from a black list of spam avatars by re-rendering the spam avatar with the distinguishable mark eliminated.

20. The method as defined in claim 19, wherein the distinguishable mark comprises an audible signature and, wherein the spam avatar identifier identifies by audible signatures.

* * * * *